United States Patent
Heo

(10) Patent No.: US 12,505,835 B2
(45) Date of Patent: Dec. 23, 2025

(54) HOME APPLIANCE AND SERVER

(71) Applicant: LG ELECTRONICS INC., Seoul (KR)

(72) Inventor: Seunghyun Heo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 319 days.

(21) Appl. No.: 17/640,303

(22) PCT Filed: Sep. 23, 2019

(86) PCT No.: PCT/KR2019/012340
§ 371 (c)(1),
(2) Date: Mar. 3, 2022

(87) PCT Pub. No.: WO2021/060570
PCT Pub. Date: Apr. 1, 2021

(65) Prior Publication Data
US 2022/0399019 A1 Dec. 15, 2022

(51) Int. Cl.
*G10L 15/22* (2006.01)
*G10L 15/26* (2006.01)
*G10L 15/30* (2013.01)

(52) U.S. Cl.
CPC .............. *G10L 15/22* (2013.01); *G10L 15/26* (2013.01); *G10L 15/30* (2013.01); *G10L 2015/223* (2013.01)

(58) Field of Classification Search
CPC ......... G10L 15/00; G10L 15/22; G10L 15/26; G10L 15/30; G10L 2015/223
See application file for complete search history.

(56) References Cited

U.S. PATENT DOCUMENTS 11,600,291 B1* 3/2023 Lan ..................... G10L 25/03
11,721,331 B1* 8/2023 Kinsey .................. G06F 3/167
704/275

(Continued)

FOREIGN PATENT DOCUMENTS

KR 1020160147854 12/2016
KR 1020180124226 11/2018
(Continued)

OTHER PUBLICATIONS

PCT International Application No. PCT/KR2019/012340, International Search Report dated Jun. 22, 2020, 2 pages.

*Primary Examiner* — Daniel C Washburn
*Assistant Examiner* — Sean E Serraguard
(74) *Attorney, Agent, or Firm* — LEE, HONG, DEGERMAN, KANG & WAIMEY

(57) ABSTRACT

A home appliance according to an embodiment of the present disclosure can include: a transceiver configured to perform communication with a display device and a server; and a processor configured to receive text data corresponding to a voice command uttered by a user from the display device through the transceiver, acquire an intent of the received text data, generate a first control command including a first intent command indicating the acquired intent, convert the first intent command included in the first control command into a second intent command suitable for the home appliance, generate a second control command including the converted second intent command, and perform an operation according to the generated second control command.

15 Claims, 13 Drawing Sheets

(56) References Cited

U.S. PATENT DOCUMENTS

| | | | |
|---|---|---|---|
| 2015/0220068 A1* | 8/2015 | Goldman-Shenhar | ........................ G05B 13/0265 700/47 |
| 2015/0294451 A1* | 10/2015 | Lee | ........................ G06T 7/0004 382/110 |
| 2015/0348554 A1* | 12/2015 | Orr | ........................ G05B 15/02 |
| 2017/0083285 A1 | 3/2017 | Meyers et al. | |
| 2017/0357637 A1* | 12/2017 | Nell | ........................ G06F 3/167 |
| 2019/0258461 A1* | 8/2019 | Li | ........................ G06F 8/41 |
| 2020/0349228 A1* | 11/2020 | Bharara | ................ G10L 15/1822 |
| 2020/0380992 A1* | 12/2020 | Lukens | .................... G10L 15/30 |
| 2021/0005191 A1 | 1/2021 | Chun et al. | |
| 2021/0366506 A1 | 11/2021 | Han et al. | |

FOREIGN PATENT DOCUMENTS

| | | |
|---|---|---|
| KR | 1020190024472 | 3/2019 |
| KR | 1020190094307 | 8/2019 |

\* cited by examiner

HOME APPLIANCE AND SERVER

CROSS-REFERENCE TO RELATED APPLICATIONS

This application is the National Stage filing under 35 U.S.C. 371 of International Application No. PCT/KR2019/012340, filed on Sep. 23, 2019, the contents of which are all incorporated by reference herein in its entirety.

TECHNICAL FIELD

The present disclosure relates to processing a voice command uttered by a user.

BACKGROUND ART

Digital TV services using wired or wireless communication networks are becoming common. Digital TV services are capable of providing various services that could not be provided by the existing analog broadcasting services.

For example, Internet Protocol Television (IPTV) and smart TV services, which are types of digital TV services, provide interactivity so that users can actively select the types of watching programs, the watching time, and the like. The IPTV and smart TV services can provide various additional services, such as Internet search, home shopping, and online games, based on such interactivity.

A recent display device such as a TV has a voice recognition service function of providing a function suitable for a voice in response to a voice uttered by a user.

In particular, in an IoT environment, a display device can receive a voice uttered by a user and control a peripheral device such as a home appliance.

A user expects to control multiple home appliances from multiple brands while using the home appliances.

However, it is impossible and inefficient to provide a natural language processing (NLP) engine or service for all home appliances to the developers of all home appliances.

Therefore, many IoT-based home appliances are controlled through the standards for IoT device control or communication protocols thereof.

Communication for such control is command-based or intent-based. This causes a problem because, when a user issues a voice command, the intent of the voice is analyzed and characteristics between devices are not considered in the process of use.

DISCLOSURE OF INVENTION

Technical Problem

The present disclosure aims to improve an error in which an intent of a voice command uttered by a user is erroneously transmitted due to intent analysis in which characteristics of home appliances are not considered.

The present disclosure aims to convert an intent of a voice command uttered by a user according to a home appliance, thereby controlling the operation of the home appliance.

Technical Solution

A home appliance according to an embodiment of the present disclosure can include: a transceiver configured to perform communication with a display device and a server; and a processor configured to receive text data corresponding to a voice command uttered by a user from the display device through the transceiver, acquire an intent of the received text data, generate a first control command including a first intent command indicating the acquired intent, convert the first intent command included in the first control command into a second intent command suitable for the home appliance, generate a second control command including the converted second intent command, and perform an operation according to the generated second control command.

A server according to an embodiment of the present disclosure can include: a communication unit configured to perform communication with a display device and one or more home appliances; and a processor configured to receive text data corresponding to a voice command uttered by a user from the display device through the communication unit, acquire an intent of the received text data, determine a home appliance among the one or more home appliances as a control target device based on the acquired intent, generate a first control command including a first intent command indicating the acquired intent, convert the first intent command included in the first control command into a second intent command suitable for the determined home appliance, generate a second control command including the converted second intent command, and transmit the generated second control command to the home appliance through the communication unit.

Advantageous Effects

According to various embodiments of the present disclosure, it is possible to reduce a probability of occurrence of an error in which an intent of a voice command uttered by a user is erroneously transmitted.

According to various embodiments of the present disclosure, an intent of a voice command uttered by a user is converted according to characteristics of home appliances, so that the home appliances are efficiently controlled according to the intent of the voice command.

BEST MODE FOR CARRYING OUT THE INVENTION

Hereinafter, embodiments relating to the present disclosure will be described in detail with reference to the drawings. The suffixes "module" and "unit" for components used in the description below are assigned or mixed in consideration of easiness in writing the specification and do not have distinctive meanings or roles by themselves.

A display device according to an embodiment of the present disclosure is, for example, an intelligent display device that adds a computer supporting function to a broadcast receiving function, and can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
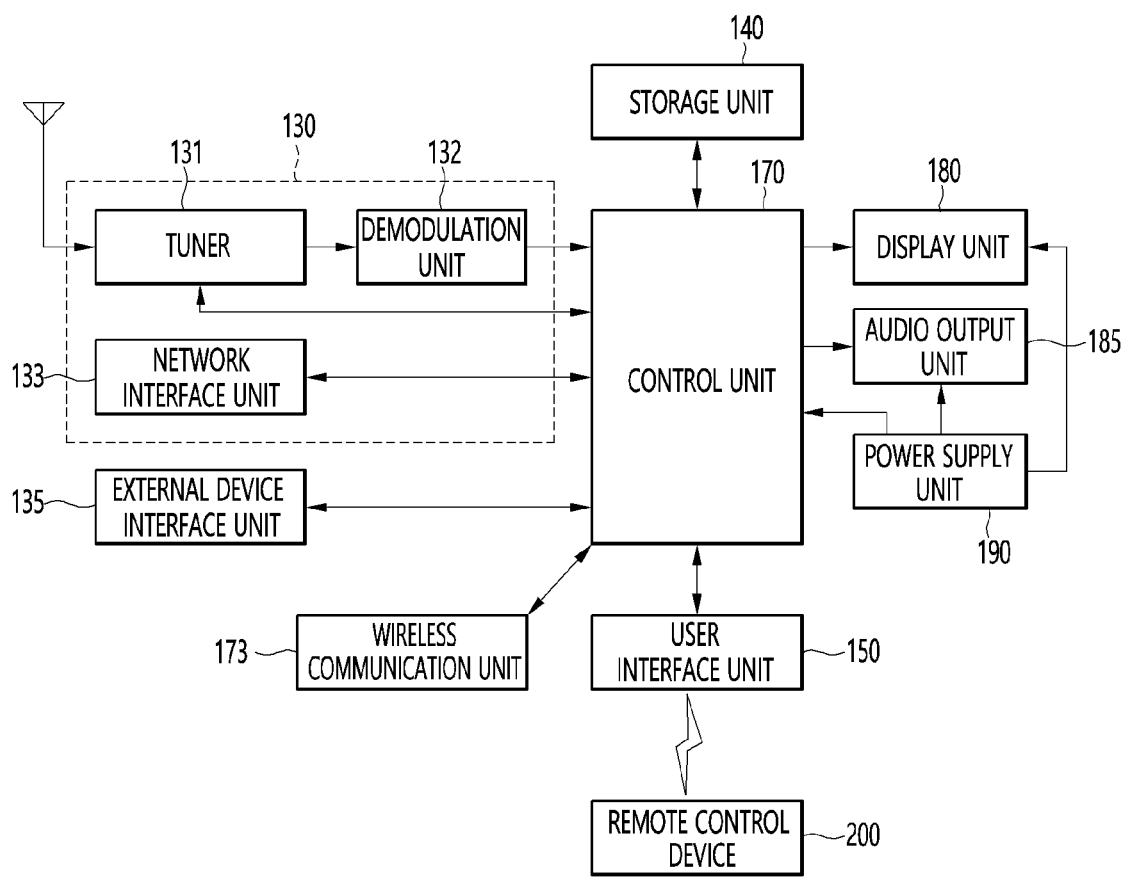
FIG. 1 is a block diagram illustrating a configuration of a display device according to an embodiment of the present invention.

FIG. 1 is a block diagram illustrating a configuration of a display device according to an embodiment of the present disclosure.

Referring to FIG. 1, a display device 100 can include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program-related data signals, and can restore the divided video signals, audio signals, and data signals into the form capable of being output.

The external device interface 135 can receive an application or an application list in an adjacent external device, and can transmit the application or the application list to the controller 170 or the storage 140.

The external device interface 135 can provide a connection path between the display device 100 and the external device. The external device interface 135 can receive at least one an image or audio output from the external device that is wirelessly or wiredly connected to the display device 100, and can transmit the image and/or the audio to the controller 170. The external device interface 135 can include a plurality of external input terminals. The plurality of external input terminals can include an RGB terminal, at least one High Definition Multimedia Interface (HDMI) terminal, and a component terminal.

An image signal of the external device input through the external device interface 135 can be output through the display 180. A voice signal of the external device input through the external device interface 135 can be output through the audio output interface 185.

An external device connectable to the external device interface unit 135 can be one of a set-top box, a Blu-ray player, a DVD player, a game console, a sound bar, a smartphone, a PC, a USB memory, and a home theater system, but this is just exemplary.

The network interface 133 can provide an interface for connecting the display device 100 to a wired/wireless network including an Internet network. The network interface 133 can transmit or receive data to or from another user or another electronic device through an accessed network or another network linked to the accessed network.

In addition, some content data stored in the display device 100 can be transmitted to a user or an electronic device, which is selected from other users or other electronic devices preregistered in the display device 100.

The network interface 133 can access a predetermined webpage through an accessed network or another network linked to the accessed network. That is, the network interface 133 can transmit or receive data to or from a corresponding server by accessing a predetermined webpage through the network.

The network interface 133 can receive content or data provided from a content provider or a network operator. That is, the network interface 133 can receive content, such as movies, advertisements, games, VODs, and broadcast signals, which are provided from the content provider or the network operator, and information relating thereto through the network.

In addition, the network interface 133 can receive firmware update information and update files provided from the network operator, and can transmit data to the Internet or content provider or the network operator.

The network interface 133 can select and receive a desired application among applications open to the air, through the network.

The storage unit 140 can store signal-processed image, voice, or data signals stored by a program in order for each signal processing and control in the control unit 170.

In addition, the storage 140 can perform a function for temporarily storing image, voice, or data signals output from the external device interface 135 or the network interface 133, and can store information on a predetermined image through a channel memory function.

The storage 140 can store an application or an application list input from the external device interface 135 or the network interface 133.

The display device 100 can play content files (e.g., video files, still image files, music files, document files, application files, etc.) stored in the storage 140, and can provide the content files to a user.

The user input interface 150 can transmit signals input by a user to the controller 170, or can transmit signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR communication methods.

In addition, the user input interface 150 can transmit, to the controller 170, control signals input from local keys (not shown) such as a power key, a channel key, a volume key, and a setting key.

Image signals that are image-processed by the controller 170 can be input to the display 180 and displayed as images corresponding to the image signals. In addition, image signals that are image-processed by the controller 170 can be input to an external output device through the external device interface 135.

Voice signals processed by the controller 170 can be output to the audio output interface 185. In addition, voice signals processed by the controller 170 can be input to the external output device through the external device interface 135.

Additionally, the controller 170 can control overall operations of the display device 100.

In addition, the controller 170 can control the display device 100 by a user command or an internal program input through the user input interface 150, and can access the network to download a desired application or application list into the display device 100.

The controller 170 can output channel information selected by a user together with the processed image or voice signals through the display 180 or the audio output interface 185.

In addition, the controller 170 can output image signals or voice signals of an external device such as a camera or a camcorder, which are input through the external device interface 135, through the display 180 or the audio output interface 185, according to an external device image playback command received through the user input interface 150.

Moreover, the controller 170 can control the display 180 to display images, and can control the display 180 to display broadcast images input through the tuner 131, external input images input through the external device interface 135, images input through the network interface, or images stored in the storage 140. In this case, an image displayed on the display 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication module 173 can perform wired or wireless communication with an external device. The wireless communication module 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication module 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication module 173 can detect (or recognize) a wearable device capable of communication around the display device 100. Furthermore, if the detected wearable device is a device authenticated to communicate with the display device 100, the control unit 170 can transmit at least part of data processed in the display device 100 to the wearable device through the wireless communication unit 173. Therefore, a user of the wearable device can use the data processed by the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display unit 180 and the audio output unit 185.

A remote control device according to an embodiment of the present disclosure will be described with reference to FIGS. 2 and 3.

Figure 2:
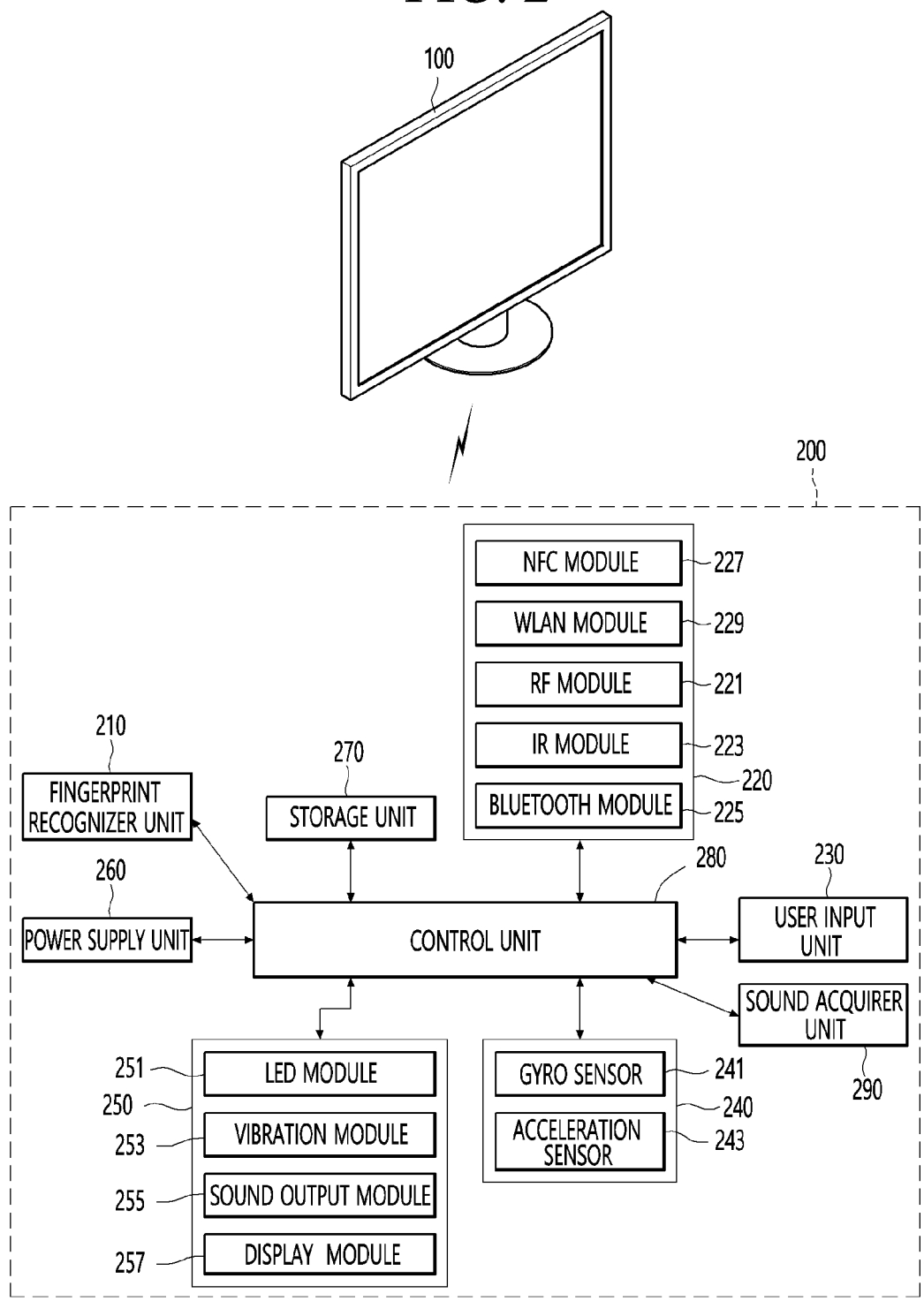
FIG. 2 is a block diagram illustrating a remote control device according to an embodiment of the present disclosure.
Figure 3:
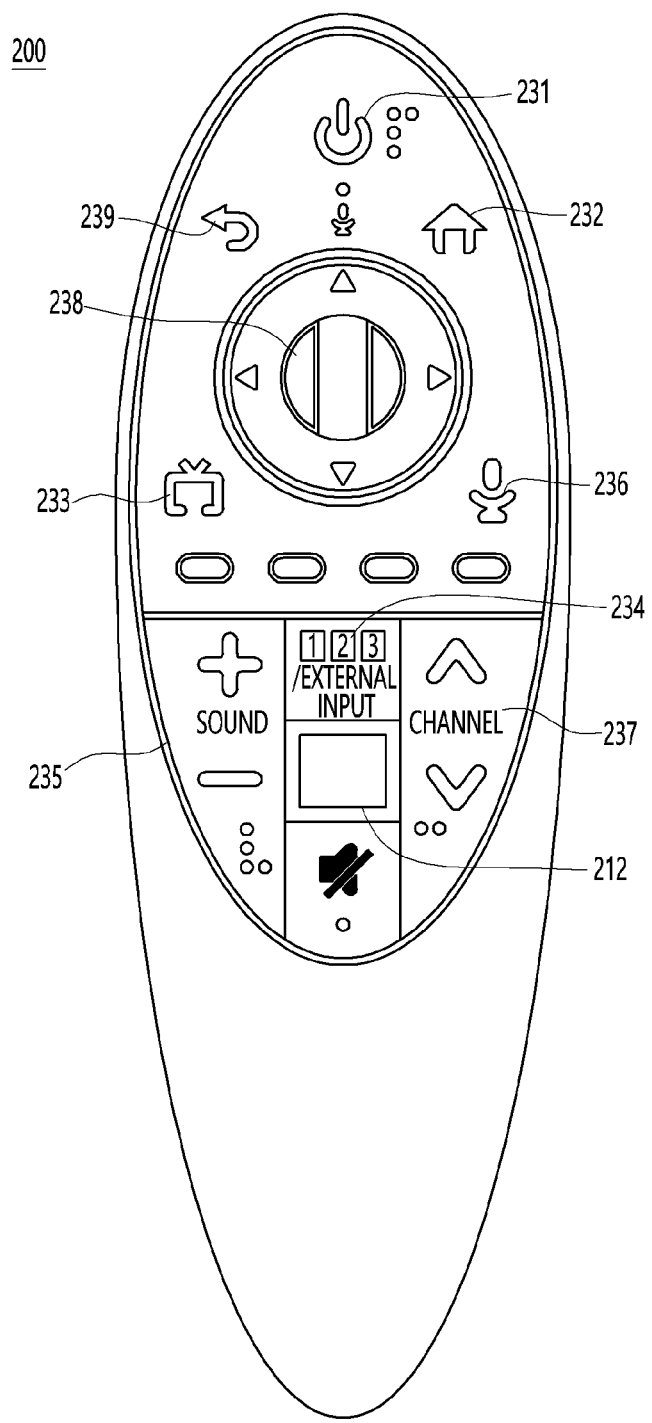
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognizer 210, a wireless communication module 220, a user input interface 230, a sensor module 240, an output interface 250, a power supply 260, a storage 270, a controller 280, and a voice acquirer 290.

Referring to FIG. 2, the wireless communication unit 220 transmits/receives signals to/from an arbitrary any one of display devices according to the above-mentioned embodiments of the present disclosure.

The remote control device 200 can include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 can include a Bluetooth module 225 capable of transmitting or receiving signals to or from the display device 100 according to a Bluetooth communication standard. In addition, the remote control device 200 can include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 can transmit signals containing information on the movement of the remote control device 200 to the display device 100 through the wireless communication module 220.

Moreover, the remote control device 200 can receive signals transmitted from the display device 100 through the RF module 221 and if necessary, can transmit a command for power on/off, channel change, and volume change to the display device 100 through the IR module 223.

The user input interface 230 can be configured with a keypad, a button, a touch pad, or a touch screen. A user can operate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be a button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The volume control button 235 can be a button for controlling a volume output from the display device 100. The voice recognition button 236 can be a button for receiving user's voice and recognizing the received voice. The channel change button 237 can be a button for receiving broadcast signals of a specific broadcast channel. The OK button 238 can be a button for selecting a specific function, and the back button 239 can be a button for returning to a previous screen.

FIG. 2 is described again.

If the user input interface 230 includes a touch screen, a user can touch a soft key of the touch screen to input a command relating to the display device 100 to the remote control device 200. In addition, the user input interface 230 can include various kinds of input interfaces operable by a user, for example, a scroll key and a jog key, and this embodiment does not limit the scope of the present disclosure.

The sensor module 240 can include a gyro sensor 241 or an acceleration sensor 243. The gyro sensor 241 can sense information on the movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor that senses a distance with respect to the display 180 of the display device 100.

The output interface 250 can output image or voice signals in response to the operation of the user input interface 235, or can output image or voice signals corresponding to signals transmitted from the display device 100. A user can recognize whether the user input interface 235 is operated or the display device 100 is controlled through the output interface 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply 260 can resume the supply of power if a predetermined key provided at the remote control device 200 is operated.

The storage 270 can store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The controller 280 controls general matters relating to the control of the remote control device 200. The controller 280 can transmit a signal corresponding to a predetermined key operation of the user input interface 235 or a signal corresponding to the movement of the remote control device 200 sensed by the sensor module 240 to the display device 100 through the wireless communication module 225.

In addition, the voice acquirer 290 of the remote control device 200 can acquire voice.

The voice acquirer 290 can include at least one microphone and acquire voice through the microphone.

Figure 4:
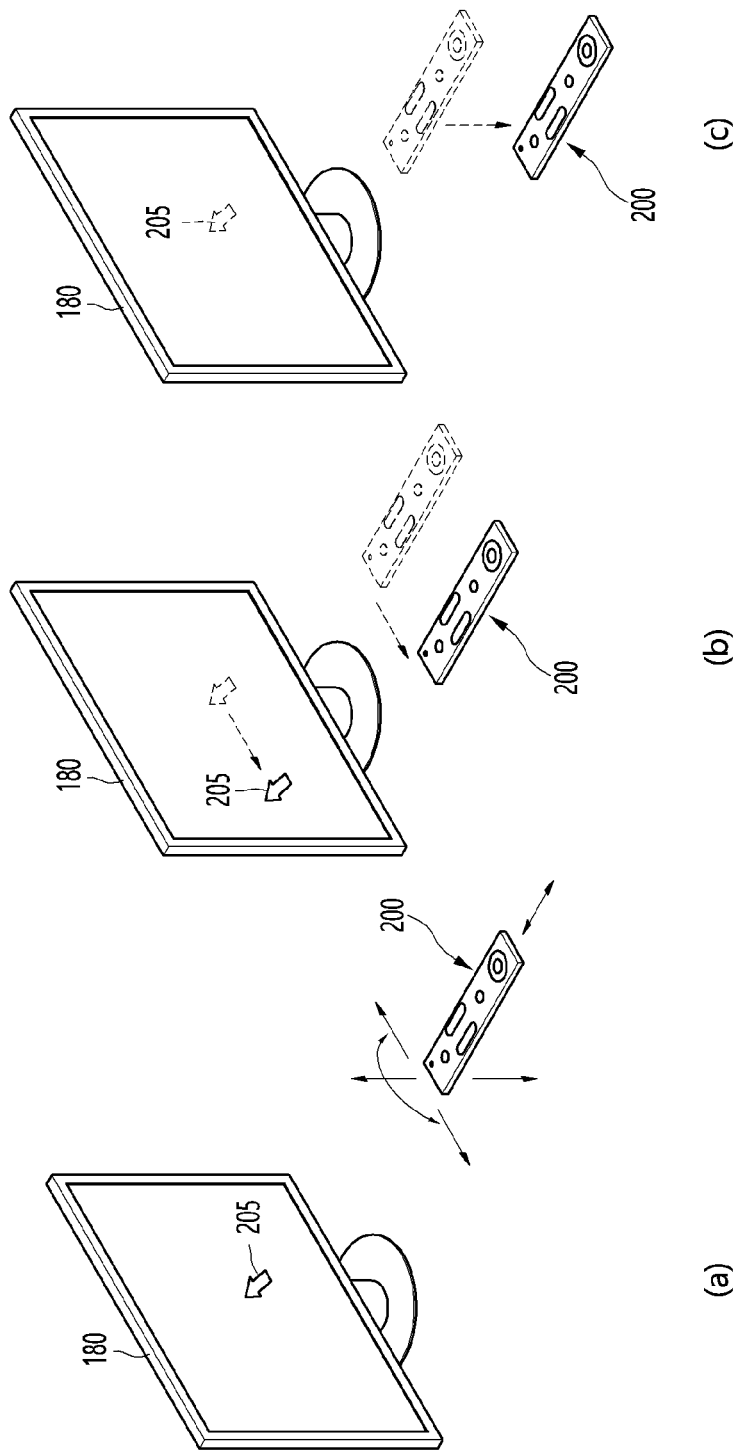
FIG. 4 is a view illustrating an example of utilizing a remote control device according to an embodiment of the present invention.

Next, FIG. 4 is described.

FIG. 4 is a view illustrating an example of utilizing a remote control device according to an embodiment of the present invention.

FIG. 4(a) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(b) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display unit 180. Thus, a selected region in the display 180 corresponding to the pointer 205 can be zoomed in and displayed in an enlarged size.

On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. That is, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
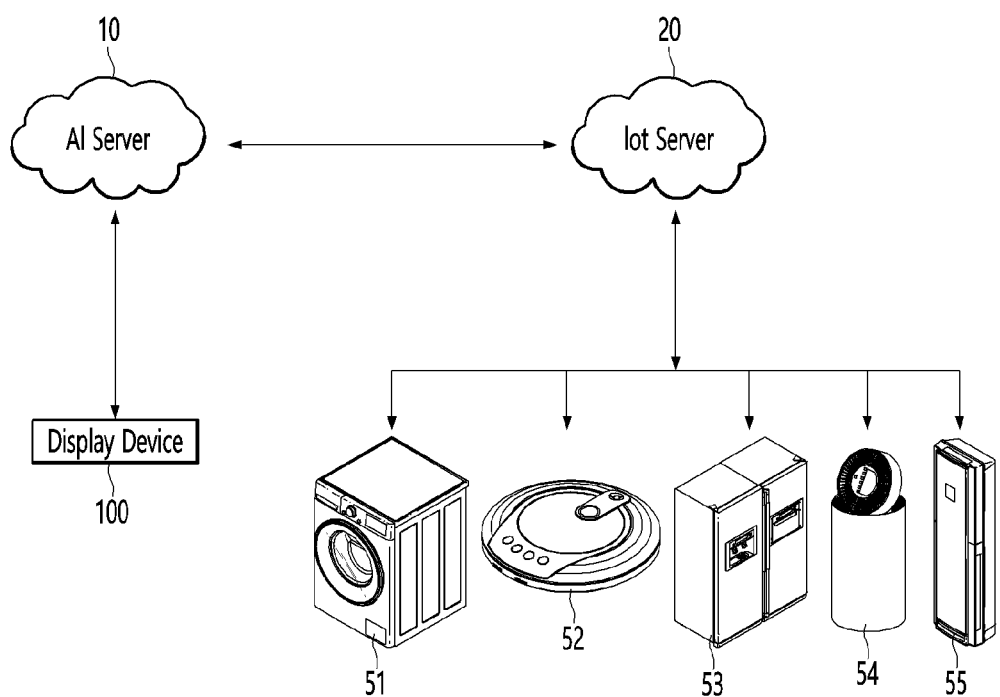
FIG. 5 is a view for describing an artificial intelligence (AI) system according to an embodiment of the present invention.

FIG. 5 is a view for describing an artificial intelligence (AI) system according to an embodiment of the present invention.

An AI system 5 can include a display device 100, an AI server 10, an IoT server 20, and a plurality of home appliances 51 to 55.

The display device 100 can wirelessly communicate with the AI server 10.

The display device 100 can transmit, to the AI server 10, voice data corresponding to a voice command uttered by a user.

The AI server 10 can acquire the intent of the voice command based on the voice data received from the display device 100.

The AI server 10 or the IoT server 20 can identify one or more home appliances associated with the acquired intent.

The AI server 10 can request status information of one or more identified home appliances through the IoT server 20.

The AI server 10 can receive state information of one or more home appliances from the IoT server 20.

The AI server 10 can acquire recommended operation information of one or more home appliances based on the acquired intent of the voice command and the received status information of one or more home appliances.

The AI server 10 can transmit, to the display device 100, the intent analysis information of the voice command, the state information of one or more home appliances, and the recommended operation information of one or more home appliances.

The display device 100 can output the received intent analysis information, the received state information of one or more home appliances, and the received recommended operation information of one or more home appliances.

The display device 100 can transmit a request for the recommended operation to the AI server 10.

The AI server 10 can transmit a control command to the IoT server 20 to perform an operation corresponding to the recommended operation information.

The IoT server 20 can transmit the control command to the corresponding home appliance.

The IoT server 20 can periodically transmit identification information and state information of one or more home appliances to the AI server 10. The home appliances can be one of a washing machine 51, a robot cleaner 52, a refrigerator 53, an air purifier 54, and an air conditioner 55.

Figure 6A:
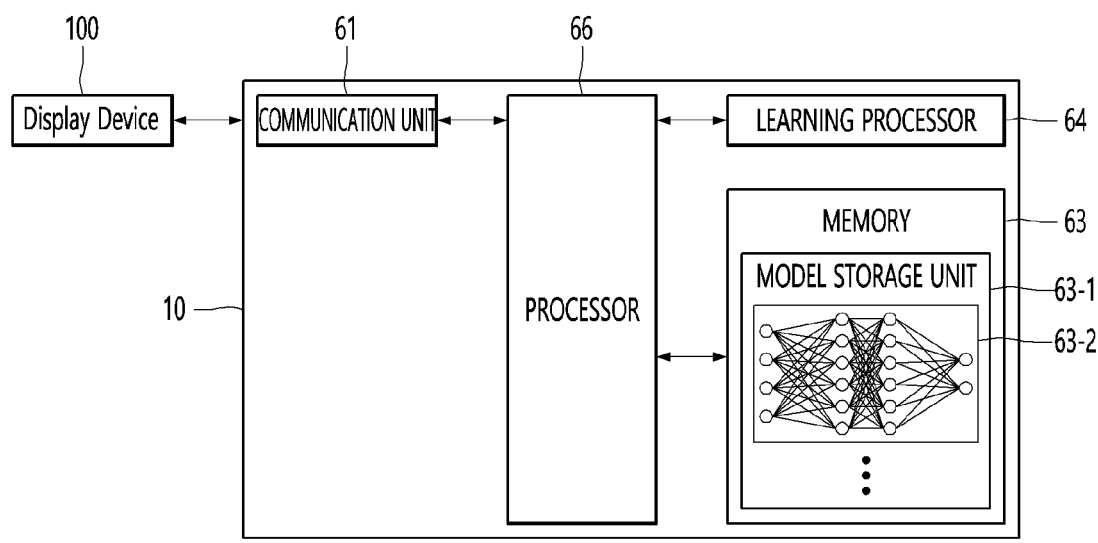
FIG. 6A is a block diagram for describing a configuration of an AI server according to an embodiment of the present disclosure.

FIG. 6A is a block diagram for describing a configuration of an AI server according to an embodiment of the present disclosure.

Referring to FIG. 6A, the AI server 10 can refer to a device that learns an artificial neural network by using a machine learning algorithm or uses a learned artificial neural network. The AI server 10 can be configured with a plurality of servers to perform distributed processing, and can be defined as a 5G network. In this case, the AI server 10 can be included as a part of the display device 100 to perform at least a part of AI processing together.

The AI server 10 can include a communication unit 61, a memory 63, a learning processor 64, and a processor 66.

The communication unit 61 can transmit or receive data to or from an external device such as the display device 100.

The memory 63 can include a model storage unit 63-1. The model storage unit 63-1 can store a model (or an artificial neural network 63-2) that is being learned or is learned through the learning processor 64.

The learning processor 64 can learn the artificial neural network 63-2 by using training data. The learning model can be used while being mounted on the AI server 10 of the artificial neural network, or can be used while being mounted on the external device such as the display device 100.

The learning model can be implemented as hardware, software, or a combination of hardware and software. When all or part of the learning model is implemented as software, one or more instructions constituting the learning model can be stored in the memory 63.

The processor 660 can infer a result value for new input data by using the learning model and generate a response or a control command based on the inferred result value.

The elements of FIG. 6A can also be included in the IoT server 20.

Figure 6B:
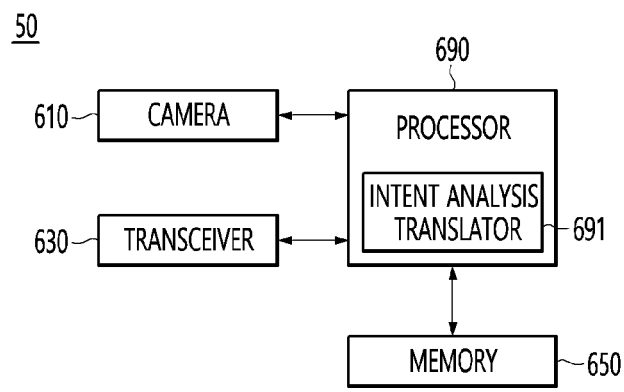
FIG. 6B is a block diagram for describing a configuration of a home appliance according to an embodiment of the present disclosure.

FIG. 6B is a block diagram for describing a configuration of a home appliance according to an embodiment of the present disclosure.

A home appliance 50 can include a camera 610, a transceiver 620, a memory 650, and a processor 690.

The camera 610 can photograph the surroundings or the inside of the home appliance 50.

The transceiver 620 can communicate with one of the AI server 10, the IoT server 20, and the display device 100.

The memory 650 can store an intent analysis table used to reinterpret an intent of a voice command.

The processor 690 can control overall operations of the home appliance 50.

The processor 690 can receive text data corresponding to a voice command uttered by a user from the display device through the transceiver.

The processor 690 can obtain an intent of the received text data and generate a first control command including a first intent command indicating the acquired intent.

An intent analysis translator 691 included in the processor 690 can convert the first intent command included in the first control command into a second intent command suitable for the home appliance, and can generate a second control command including the converted second intent command.

The processor 690 can control the operation of the home appliance 50 to perform an operation according to the generated second control command.

Figure 7:
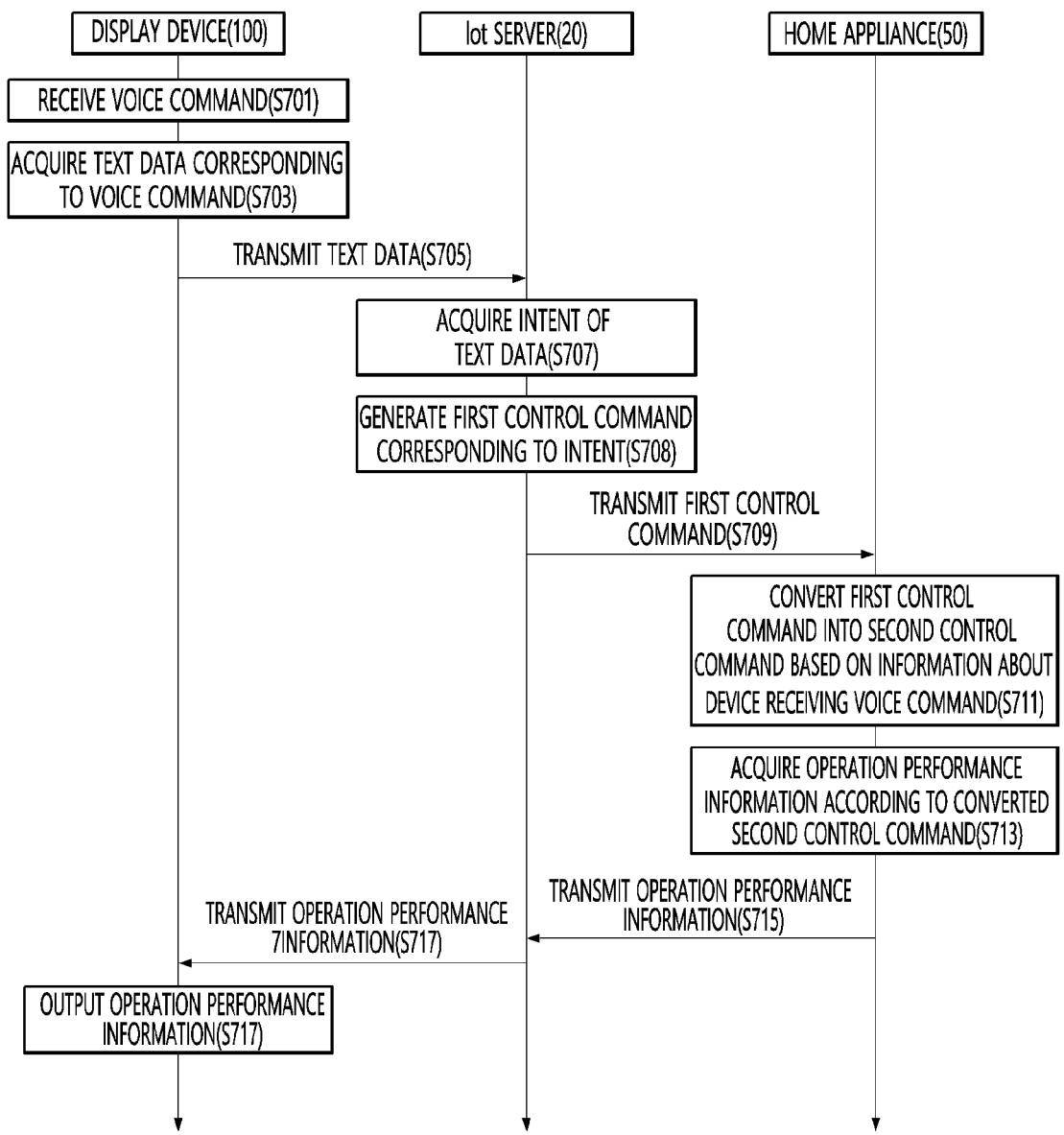
FIG. 7 is a ladder diagram for an operating method of an AI system according to an embodiment of the present disclosure.

FIG. 7 is a ladder diagram for describing an operating method of an AI system according to an embodiment of the present disclosure.

Hereinafter, it is assumed that the AI system includes the display device 100, the IoT server 20, and the home appliance 50, but the present disclosure is not limited thereto, and can further include the AI server 10.

The IoT server 20 can include the elements of the AI server 10 configured in FIG. 6.

That is, the IoT server 20 can include a communication unit 61, a memory 63, a learning processor 64, and a processor 66.

The control unit 170 of the display device 100 receives a voice command uttered by a user (S701).

In an embodiment, the control unit 170 can receive the voice command uttered by the user through a microphone provided in the user input interface unit 150.

In still another embodiment, the control unit 170 can receive the voice command received by the remote control device 200.

The control unit 170 can convert a voice signal corresponding to the voice command into voice data.

The control unit 170 of the display device 100 acquires text data corresponding to the voice command (S703).

The control unit 170 can convert the voice data into text data by using a speech to text (STT) engine included in the control unit 170.

As another example, the control unit 170 can transmit the voice data to an STT server (not shown), and can receive, from the STT server, the text data converted by the STT server.

The control unit 170 of the display device 100 transmits the text data to the IoT server 20 through the network interface unit 133 (S705).

As another example, the control unit 170 can process the voice data by pulse code modulation (PCM) and transmit the processed voice data to the IoT server 20. In this case, the processor 66 of the IoT server 20 can convert the received voice data into text data.

The processor 66 of the IoT server 20 acquires the intent of the received text data (S707), and generates a first control command corresponding to the intent (S708).

The processor 66 of the IoT server 20 can acquire the intent of the text data by using an NLP engine.

As another example, the IoT server 20 can transmit the text data to the AI server 10, and can receive, from the AI server 10, the intent that the AI server 10 obtains through the NLP.

The processor 66 of the IoT server 20 can generate a first control command based on the acquired intent and information about a device receiving the voice command.

The first control command can be a command for controlling the operation of the home appliance 50 according to the intent.

The first control command can include a first intent command (or action command) indicating the intent of the text data, a keyword, and a device name of a device receiving a voice command. The configuration of the first control command will be described below in detail.

The processor 66 of the IoT server 20 transmits the first control command to the home appliance 50 through the communication unit 61 (S709).

The processor 66 of the IoT server 20 can determine a target device to be controlled according to the voice command, based on an intent analysis result of the text data. For example, the processor 66 of the IoT server 20 can determine, as the target device, a home appliance associated with a keyword of text data among a plurality of home appliances connected to the IoT server 20.

The IoT server 20 can transmit the first control command to the determined target device.

The processor 690 of the home appliance 50 converts the first control command into a second control command based on the information about the device receiving the voice command (S711).

The processor 690 of the home appliance 50 can reanalyze the first control command based on the device name of the device receiving the voice command, which is included in the first control command.

The intent analysis translator 691 included in the processor 690 of the home appliance 50 can convert the first intent command into a second intent command based on the device name included in the first control command.

The intent analysis translator 691 can generate the second control command including the converted second intent command.

The processor 690 of the home appliance 50 acquires operation performance information according to the converted second control command (S713), and transmits the acquired operation performance information to the IoT server 20 through the transceiver 630 (S715).

The processor 690 of the home appliance 50 can perform an operation according to the converted second control command, and can acquire operation performance information indicating a result of performing the operation.

The processor 66 of the IoT server 20 transmits the operation performance information received from the home appliance 50 to the display device 100 (S717).

The control unit 170 of the display device 100 outputs the operation performance information received from the IoT server 20 (S717).

The control unit 17 of the display device 100 can display the operation performance information through the display unit 180, or can output the operation performance information as audio through the audio output unit 185.

Figure 8:
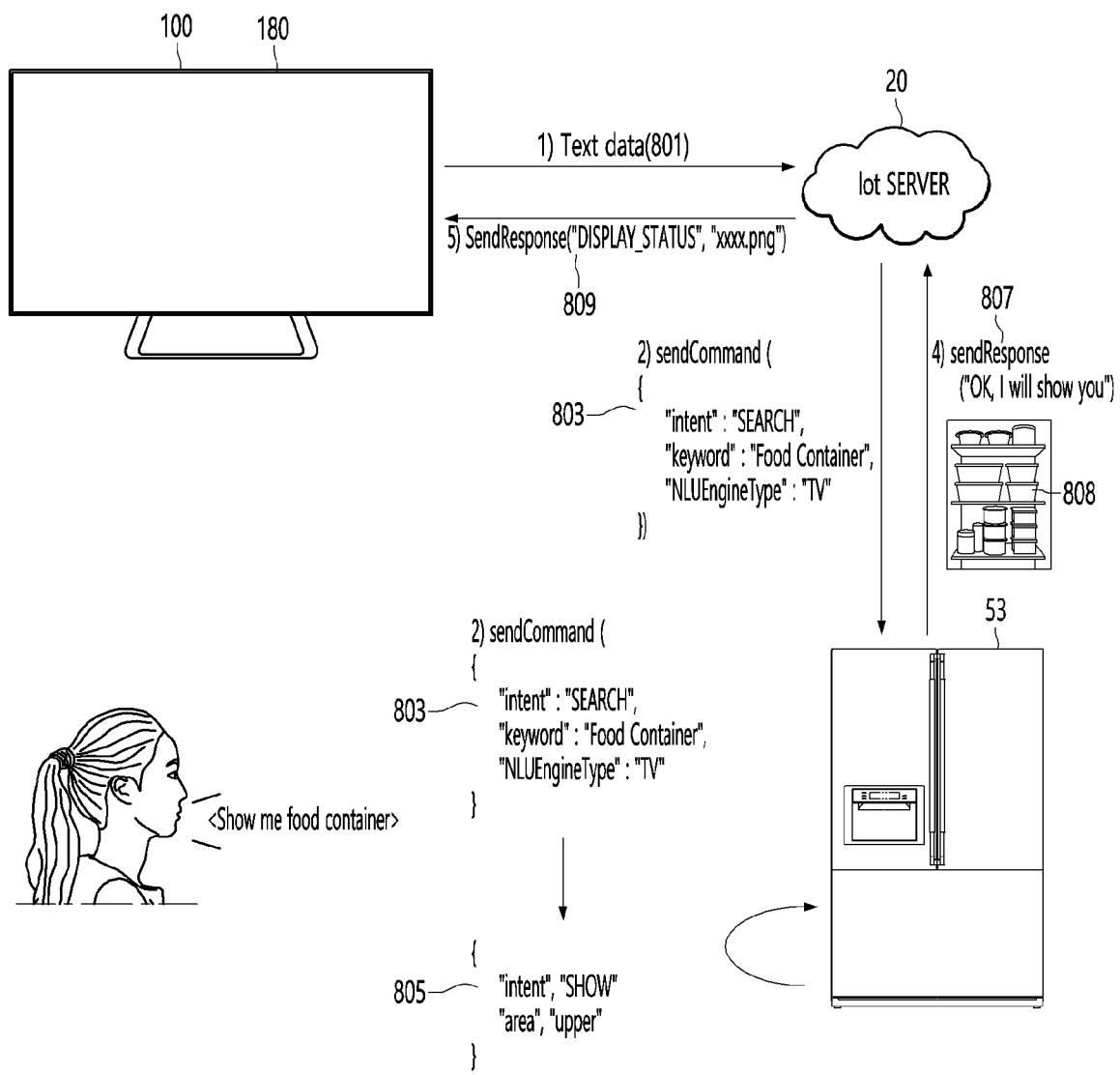
FIGS. 8 and 9 are views for describing a process of controlling a home appliance by reinterpreting an intent of a voice command uttered by a user according to characteristics of the home appliance, according to an embodiment of the present disclosure.
Figure 9:
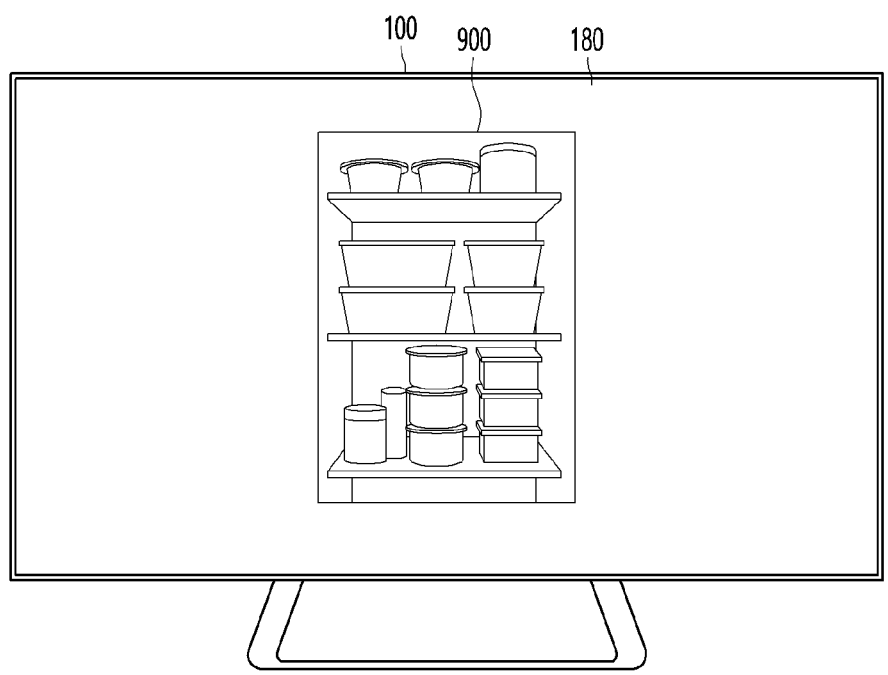

FIGS. 8 and 9 are views for describing a process of controlling a home appliance by reinterpreting an intent of a voice command uttered by a user according to characteristics of the home appliance, according to an embodiment of the present disclosure.

In FIG. 8, it is assumed that the user uttered the voice command <Show me food container> and the home appliance 50 is the refrigerator 53.

The display device 100 can receive the voice command uttered by the user and can acquire text data of voice data corresponding to the voice command.

The display device 100 can acquire text data of voice data from an STT server or through an STT engine provided therein.

The display device 100 can transmit the acquired text data 801 to the IoT server 20.

The IoT server 20 can acquire the intent of the text data 801 by transmitting the text data to an AI server (not shown). The IoT server 20 can generate a first control command 803 based on the acquired intent.

The first control command 803 can include a first intent command indicating the intent of the text data, a keyword, and a device name. The intent of the text data 801 can indicate the intent of a user corresponding to show.

A result of analyzing the intent of "show" can be "search". In addition, the keyword of the text data 801 can be acquired as "food container". The keyword can be a word classified as a noun in the text data. The device name can indicate a device receiving the voice command uttered by the user. In FIG. 8, the device name can be TV.

In FIG. 8, since the voice command uttered by the user is the display device 100, the device name can be a name for identifying the display device 100.

The device name can be an identifier indicating a device performing NLP on the voice command.

The intent analysis translator 691 of the refrigerator 53 can receive the first control command 803 from the IoT server 20 and analyze the first control command 803.

The intent analysis translator 691 provided in the refrigerator 53 can convert the first intent command included in the first control command 803 into a second intent command, based on the device name included in the first control command 803.

Specifically, the refrigerator 53 can convert the first intent command into the second intent command based on the intent analysis table stored in the memory 650. The intent analysis table can be a table used to convert the first intent into the second intent according to the device receiving the voice command.

The intent analysis translator 691 of the refrigerator 53 can convert the first intent command "search" into the second intent command "show" by using the intent analysis table.

The intent analysis translator 691 of the refrigerator 53 can convert the first control command 803 into the second control command 805 including the second intent command and a default capturing area (upper).

The processor 690 of the refrigerator 53 can determine that the intent converted according to the second control command 805 is to show the inside of the upper end of the refrigerator 53.

The processor 690 of the refrigerator 53 can photograph the inside of the upper compartment of the refrigerator 53 by using the camera 610 provided in the refrigerator 53 according to the intent of the second control command 805.

The processor 690 of the refrigerator 53 can generate, in response to the first control command 803, operation performance information 807 including the photographed image data 808, and can transmit the generated operation performance information 807 to the IoT server 20.

In response to the transmission of the text data 801, the IoT server 20 can transmit a response message 809 including the operation performance information 807 to the display device 100.

The display device 100 can display an internal image 900 of the refrigerator 53 on the display unit 180 based on the image data 808 included in the response message 809.

As such, according to an embodiment of the present disclosure, the intent of the voice command uttered by the user is converted according to characteristics of the home appliances, so that the home appliances are efficiently controlled according to the intent of the voice command.

Figure 10:
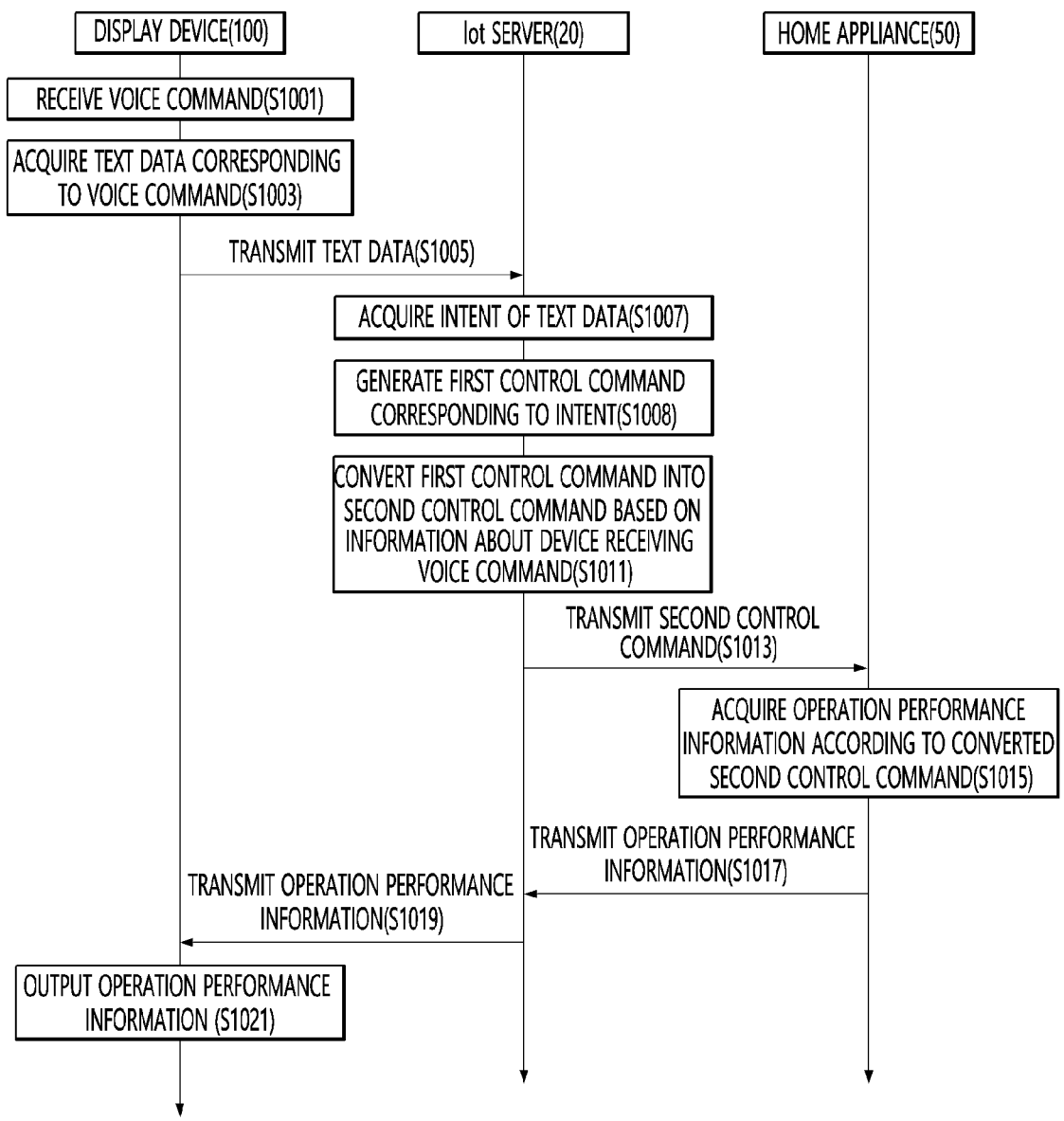
FIG. 10 is a ladder diagram for describing an operating method of an AI system according to another embodiment of the present invention.

FIG. 10 is a ladder diagram for describing an operating method of an AI system according to another embodiment of the present invention.

In particular, FIG. 10 illustrates an embodiment in which the IoT server 20 converts the first control command reflecting the intent of the voice command into the second control command, and transmits the converted second control command to the home appliance 50.

In each step of FIG. 10, a detailed description of parts overlapping those of FIG. 7 will be omitted.

The control unit 170 of the display device 100 receives a voice command uttered by a user (S1001).

The control unit 170 of the display device 100 acquires text data corresponding to the voice command (S1003).

The control unit 170 of the display device 100 transmits the text data to the IoT server 20 through the network interface unit 133 (S1005).

The processor 66 of the IoT server 20 acquires the intent of the received text data (S1007), and generates a first control command corresponding to the intent (S1009).

The processor 66 can obtain the intent of the text data by using the NLP engine.

As another example, the processor 66 can transmit the text data to the AI server 10, and can receive, from the AI server 10, the intent acquired by the AI server 10.

The first control command can include a first intent command indicating the intent of the text data, a keyword of the text data, and a device name of a device receiving the voice command.

The processor 66 of the IoT server 20 can determine a target device to be controlled according to the voice command, based on an intent analysis result of the text data. For example, the processor 66 of the IoT server 20 can determine, as the target device, a home appliance associated with a keyword of text data among a plurality of home appliances connected to the IoT server 20.

The processor 66 of the IoT server 20 converts the first control command into the second control command based on the information of the target device that matches the intent of the text data (S1011).

The processor 66 can convert the first intent command into the second intent command based on the device information included in the first control command by using the intent analysis translator.

The processor 66 can generate the second control command including the second intent command.

The target device information can include identification information for identifying a device to perform an operation corresponding to the intent of the voice command uttered by the user. The identification information can include one or more of a device name and a device model name.

The target device information can include information for identifying a device requesting NLP of the voice command.

The processor 66 of the IoT server 20 transmits the second control command to the home appliance 50 through the communication unit 61 (S1013).

The processor 66 can transmit the second control command to the home appliance 50 that is the determined target device.

The processor 690 of the home appliance 50 acquires operation performance information according to the converted second control command (S1015), and transmits the acquired operation performance information to the IoT server 20 through the transceiver 630 (S1017).

The processor 66 of the IoT server 20 transmits the operation performance information received from the home appliance 50 to the display device 100 (S1019).

The control unit 170 of the display device 100 outputs the operation performance information received from the IoT server 20 (S1021).

Figure 11:
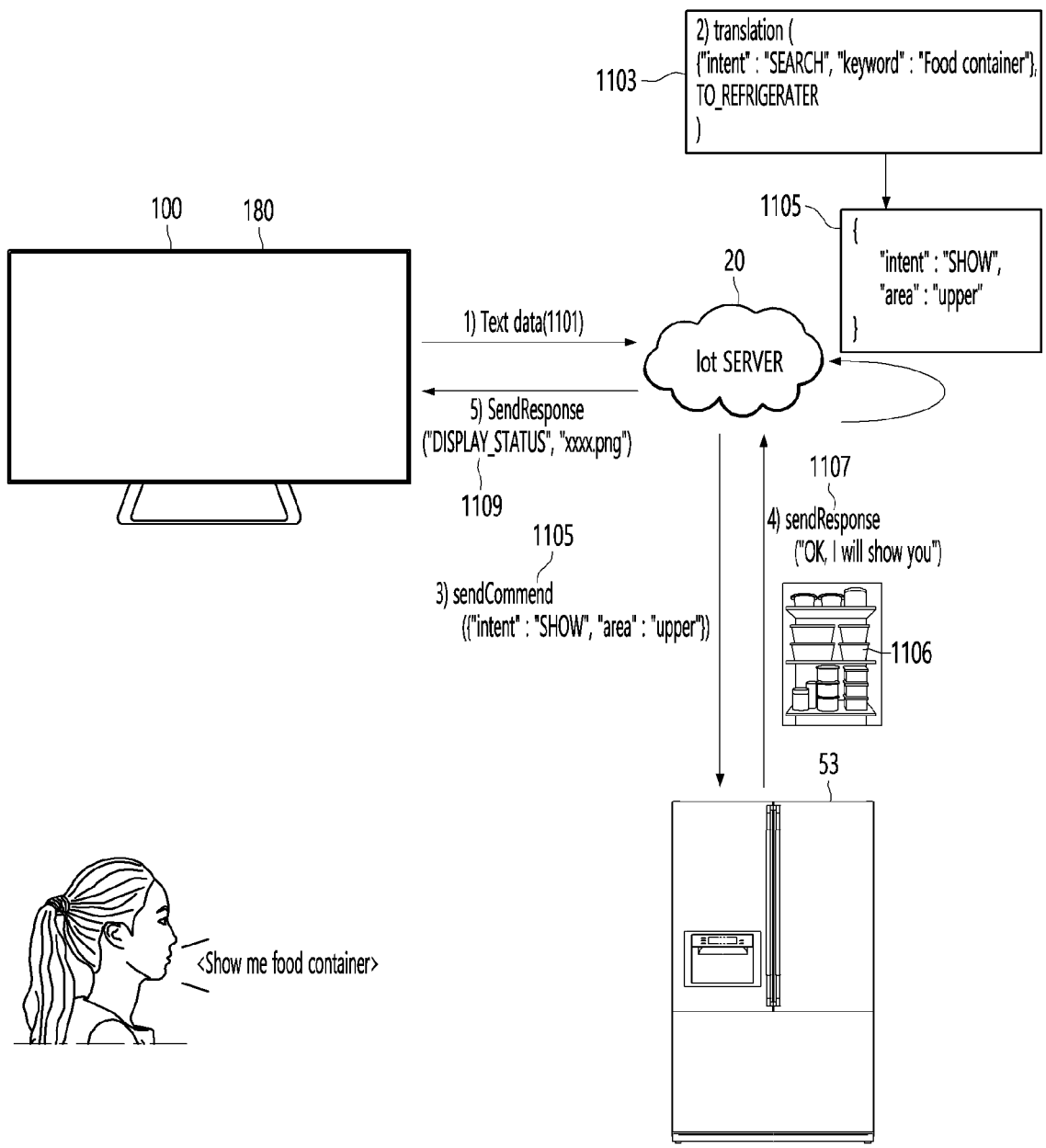
FIG. 11 is a view for describing a process of controlling a home appliance by reinterpreting an intent of a voice command uttered by a user according to characteristics of the home appliance, according to an embodiment of the present disclosure.

FIG. 11 is a view for describing a process of controlling a home appliance by reinterpreting an intent of a voice command uttered by a user according to characteristics of the home appliance, according to an embodiment of the present disclosure.

In FIG. 11, it is assumed that the user uttered the voice command <Show me food container> and the home appliance 50 is the refrigerator 53.

The display device 100 can receive the voice command uttered by the user and can acquire text data of voice data corresponding to the voice command.

The display device 100 can acquire text data of voice data from an STT server or through an STT engine provided therein.

The display device 100 can transmit the acquired text data 1101 to the IoT server 20.

The IoT server 20 can acquire the intent of the text data 1101 by transmitting the text data to an AI server (not shown). The IoT server 20 can generate a first control command 1103 based on the acquired intent.

The first control command 1103 can include a first intent command indicating the intent of the text data 1101, a keyword included in the text data 1101, and the name of the target device.

The first intent command can be a command indicating a result of analyzing the intent of "show" included in the text data 1101.

A result of analyzing the intent of "show" may be "search". In addition, the keyword of the text data 1101 can be acquired as "food container". The keyword can be a word classified as a noun in the text data.

The name of the target device can indicate the name of the device to be controlled according to the intent of the user's voice command.

Since the keyword included in the text data 1101 is "food container", the target device can be determined as the refrigerator 53 capable of storing food.

The intent analysis translator of the IoT server 20 cab convert the first control command 1103 into a second control command 1105 based on the name of the target device.

The intent analysis translator can convert the first intent command included in the first control command 1103 into the second intent command, based on the name of the target device included in the first control command 1103.

Specifically, the IoT server 20 can convert the first intent command into the second intent command based on the intent analysis table stored in the memory 63. The intent analysis table can be a table used to convert the first intent into the second intent according to the device receiving the voice command.

The intent analysis table can be a table including a correspondence relationship between the intent of the text data, the keyword, the name of the device receiving the voice command, the name of the target device, and the converted intent.

The intent analysis translator 691 can convert the first control command 1103 into the second control command 1105 including the second intent command and a default capturing area (upper).

The first intent command can be converted into the second intent command so as to be interpreted by the target device.

The IoT server 20 can transmit the converted second control command 1105 to the refrigerator 53.

The refrigerator 53 can photograph the inside of the upper compartment of the refrigerator 53 by using the camera 610 provided in the refrigerator 53 according to the intent of the second control command 1105 received from the IoT server 20.

The processor 690 of the refrigerator 53 can generate, in response to the second control command 1105, operation performance information 1107 including the photographed image data 1106, and can transmit the generated operation performance information 1107 to the IoT server 20.

In response to the transmission of the text data 1101, the IoT server 20 can transmit a response message 1109 including the operation performance information 1107 to the display device 100.

The display device 100 can display an internal image of the refrigerator 53 on the display unit 180 based on the image data 1106 included in the response message 1109.

As such, according to an embodiment of the present disclosure, the intent of the voice command uttered by the user is converted according to characteristics of the home appliances, so that the home appliances are efficiently controlled according to the intent of the voice command.

Figure 12:
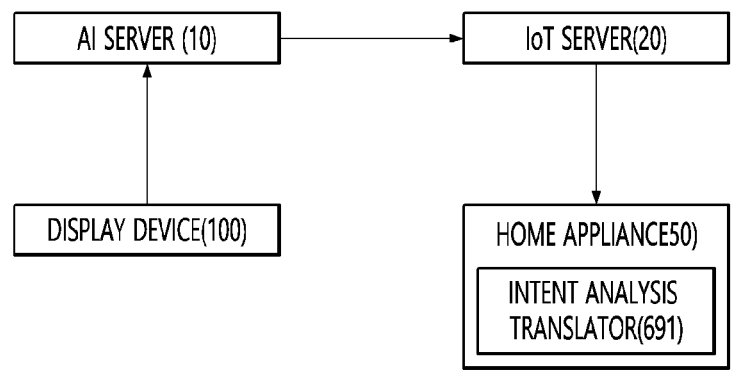
FIGS. 12 and 13 are views for describing an arrangement position of an intent analysis translator according to an embodiment of the present disclosure.
Figure 13:
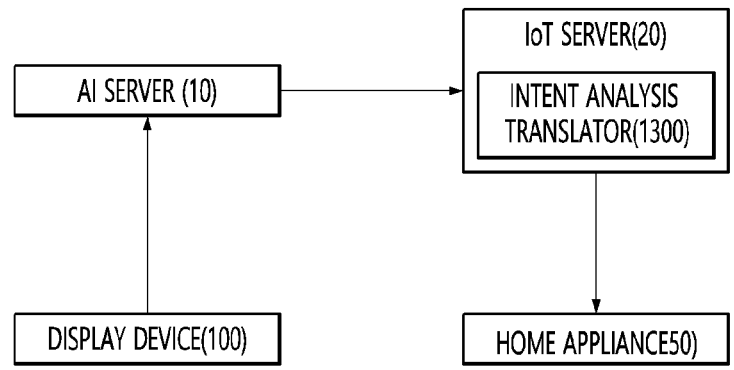

FIGS. 12 and 13 are views for describing an arrangement position of an intent analysis translator according to an embodiment of the present disclosure.

FIG. 12 shows that the intent analysis translator 691 for converting the first control command into the second control command capable of being converted into the intent that can be processed by the home appliance is disposed in the home appliance 50.

FIG. 13 shows that the intent analysis translator 1300 for converting the first control command into the second control command capable of being converted into the intent that can be processed by the home appliance is disposed in the IoT server 20.

Referring to FIG. 12, the display device 100 can transmit, to the AI server 10, voice data of a voice command uttered by a user.

The AI server 10 can convert the voice data into text data and acquire the intent of the converted text data.

The AI server 20 can transmit, to the IoT server 20, device information of the display device 100, which is a subject that has transmitted the acquired intent and voice data.

The IoT server 20 can generate a first control command based on the acquired intent and device information, and can transmit the generated first control command to the home appliance 50.

The intent analysis translator 691 of the home appliance 50 can convert the intent and the device information included in the first control command into the second control command.

The home appliance 50 performs an operation according to the intent of the converted second control command and transmits, to the IoT server 20, operation performance information indicating a result of performing the operation.

The IoT server 20 can transmit the operation performance information to the display device 100, and the display device 100 can output the operation performance information.

Referring to FIG. 13, the display device 100 can transmit, to the AI server 10, the voice data of the voice command uttered by the user.

The AI server 10 can convert the voice data into text data and acquire the intent of the converted text data.

The AI server 20 can transmit, to the IoT server 20, device information of the display device 100, which is a subject that has transmitted the acquired intent and voice data.

The IoT server 20 can generate a first control command based on the acquired intent and device information. The IoT server 20 can determine the target device based on the keyword and the first intent command included in the first control command.

The IoT server 20 can convert the first intent command into the second intent command according to characteristics of the determined target device. That is, the IoT server 20 can generate the second control command including the converted second intent command.

The IoT server 20 can transmit the generated second control command to the home appliance 50 that is the determined target device. The home appliance 50 can perform an operation according to the second control command and can transmit, to the IoT server 20, operation performance information indicating a result of performing the operation.

The IoT server 20 can transmit the operation performance information to the display device 100, and the display device 100 can output the operation performance information.

Figures 14, 15:
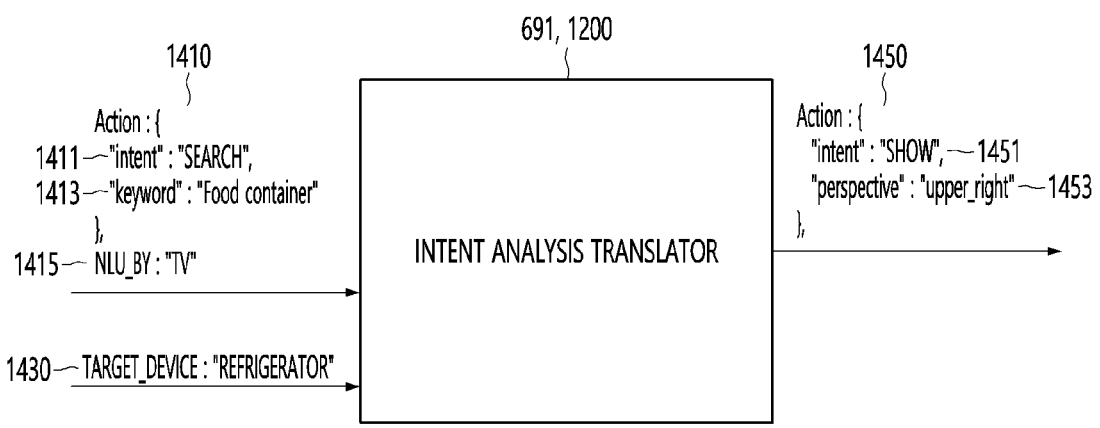
FIG. 14 is a view for describing a process in which an intent analysis translator converts a control command according to an embodiment of the present disclosure.
FIG. 15 is a view for describing an intent analysis table according to an embodiment of the present disclosure.

FIG. 14 is a view for describing a process in which an intent analysis translator converts a control command according to an embodiment of the present disclosure, and FIG. 15 is a view for describing an intent analysis table according to an embodiment of the present disclosure.

The intent analysis translators 691 and 1200 can convert a first control command 1410 into a second control command 1450 based on a first control command 1410 and target device information 1430.

The first control command 1450 can include a first intent command 1411 indicating an intent of text data corresponding to a voice command uttered by a user, a keyword 1413 of the text data, and a name 1415 of a device receiving the voice command.

The target device information 1430 can be a device name determined by analysis of the keyword 1413 of the text data.

The target device information 1430 can be a name of a target control device determined according to the intent analysis of the text data.

The AI server 10 or the IoT server 20 can extract the keyword of the text data by using an NLP engine and can determine, from the keyword, a target device to be controlled according to the voice command.

The intent analysis translators 691 and 1200 can convert the first intent command 1411 into a second intent command 1451 that the target device can understand corresponding to the target device information 1430.

The intent analysis translators 691 and 1200 can convert the first intent command 1411 into the second intent command 1451 with reference to the intent analysis table 1500 shown in FIG. 15.

The intent analysis table 1500 can include a correspondence relationship between text data 1501 corresponding to a voice command uttered by a user, a first intent command 1503 of the text data 1501, a keyword 1505 of the text data 1501, an NLU engine 1507, a name 1509 of a target device, and a target intent (second intent command) 1511.

The NLU engine 1507 can indicate what kind of device the device requested for NLP of the voice command is.

The intent analysis translators 691 and 1200 can acquire the second intent command 1511 matching the previously acquired first intent command 1503 through the intent analysis table 1500.

The intent analysis translators 691 and 1200 can determine the operation of the home appliance 50 based on the keyword 1505. That is, the intent analysis translators 691 and 1200 can acquire a payload key 1513 and a payload value 1515, which are control logics of the home appliance 50, based on the keyword 1505.

For example, when the converted intent is to request photographing of the inside of the refrigerator 53, the payload key 1513 can indicate perspective and the payload value 1515 can indicate photographing position information.

As shown in FIG. 14, the intent analysis translators 691 and 1200 can receive the first control command 1401 and generate the second control command 1450 including the second intent command 1511 and the payload value 1515.

According to an embodiment of the present disclosure, the above-described method can be implemented with codes readable by a processor on a medium in which a program is recorded. Examples of the medium readable by the processor include a ROM, a RAM, a CD-ROM, a magnetic tape, a floppy disk, an optical data storage device, and the like, and can include those implemented in the form of carrier wave (for example, transmission over Internet).

The display device described above is not limitedly applicable to the configuration and method of the above-described embodiments, and the embodiments are configured by selectively combining all or part of each of the embodiments such that various modifications can be made.

The invention claimed is:

1. A server comprising:
a communication unit configured to perform communication with a device and one or more home appliances; and a processor configured to:
receive, from the device via the communication unit, text data corresponding to a voice command uttered by a user, wherein the voice command uttered by the user is directly received by the device;
acquire an intent of the received text data based on the device that directly received the voice command uttered by the user;

determine a control target device among the one or more home appliances based on a keyword of the text data;

determine a first intent command indicating the acquired intent of the text data based on the device that directly received the voice command uttered by the user;

generate a first control command including the first intent command indicating the acquired intent, the keyword of the text data, and information comprising a device name of the device that directly received the voice command uttered by the user;

convert the first intent command included in the first control command into a second intent command suitable for the determined control target device;

generate a second control command including the converted second intent command based on information of the control target device; and transmit the generated second control command to the control target device through the communication unit, wherein the first intent command is converted into the second intent command, to include a payload value indicating position information regarding an interior of the control target device.

2. The server of claim 1, wherein the processor is further configured to:

receive operation performance information indicating a result of performing an operation according to the second control command; and transmit the received operation performance information to the device.

3. The server of claim 1, wherein the processor is further configured to convert the first intent command into the second intent command recognizable by the control target device.

4. The server of claim 3, further comprising a memory including an intent analysis table including a correspondence relationship between a home appliance, the device name of the device that directly received the voice command, the first intent command, and the second intent command, wherein the processor is further configured to convert the first intent command into the second intent command with reference to the intent analysis table.

5. The server of claim 2, wherein the device that directly received the voice command is a display device, and the first control command further includes information about the display device receiving the voice command.

6. The server of claim 1, wherein the processor includes an intent analysis translator, and wherein the intent analysis translator is configured to convert the first intent command into the second intent command based on a name of the control target device.

7. The server of claim 5, wherein the processor is further configured to determine an operation of the control target device based on the keyword of the text data.

8. A home appliance comprising:

a transceiver configured to perform communication with a device and a server; and a processor configured to:

receive, from the device via the transceiver, text data corresponding to a voice command uttered by a user, wherein the voice command uttered by the user is directly received by the device;

acquire an intent of the received text data based on information of the device that directly received the voice command uttered by the user;

determine a first intent command indicating the acquired intent of the text data based on the device that directly received the voice command uttered by the user;

generate a first control command including the first intent command indicating the acquired intent, a keyword of the text data, and information comprising a device name of the device that directly received the voice command uttered by the user;

convert the first intent command included in the first control command into a second intent command suitable for the home appliance based on an intent analysis table including a correspondence relationship between the home appliance, the device name of the device that directly received the voice command, the first intent command, and the second intent command;

generate a second control command including the converted second intent command based on information of the home appliance; and perform an operation according to the generated second control command, wherein the first intent command is converted into the second intent command, to include a payload value indicating position information regarding an interior of the home appliance.

9. The home appliance of claim 8, wherein the processor is further configured to transmit, to the server, operation performance information indicating a result of performing the operation of the home appliance according to the second control command.

10. The home appliance of claim 8, wherein the processor is further configured to convert the first intent command into the second intent command recognizable by the home appliance based on information of the home appliance.

11. The home appliance of claim 9, wherein the device that directly received the voice command is a display device, and the first control command further includes information about the display device that directly received the voice command.

12. The home appliance of claim 11, wherein the processor is further configured to determine an operation of the home appliance based on the keyword of the text data.

13. The home appliance of claim 8, wherein the processor is further configured to:

transmit the text data to an artificial intelligence server; and receive the intent of the text data from the artificial intelligence server.

14. The server of claim 1, wherein the payload value indicates photographing position information for photographing a specific portion of the interior of the control target device.

15. The home appliance of claim 8, wherein the payload value indicates photographing position information for photographing a specific portion of the interior of the home appliance.

* * * * *